United States Patent
Erinjippurath et al.

(10) Patent No.: US 8,880,573 B2
(45) Date of Patent: Nov. 4, 2014

(54) SYSTEM AND METHOD OF DYNAMIC PRECISION OPERATIONS

(75) Inventors: Gopal Erinjippurath, San Francisco, CA (US); Jared D. Smith, San Francisco, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 492 days.

(21) Appl. No.: 13/271,095

(22) Filed: Oct. 11, 2011

(65) Prior Publication Data

US 2012/0089655 A1    Apr. 12, 2012

Related U.S. Application Data

(60) Provisional application No. 61/392,314, filed on Oct. 12, 2010.

(51) Int. Cl.
*G06F 7/00* (2006.01)
*G06F 9/45* (2006.01)
*G06F 7/38* (2006.01)

(52) U.S. Cl.
CPC . *G06F 7/38* (2013.01); *G06F 8/447* (2013.01)
USPC ...................................................... 708/204

(58) Field of Classification Search
CPC ...... H03M 7/24; G06F 9/30025; G06F 7/572; G06F 7/4876; G06F 7/491
USPC ...................................................... 708/204
See application file for complete search history.

(56) References Cited

U.S. PATENT DOCUMENTS

| | | | |
|---|---|---|---|
| 4,953,119 A | 8/1990 | Wong | |
| 5,125,092 A | 6/1992 | Prener | |
| 5,268,855 A * | 12/1993 | Mason et al. | 708/204 |
| 5,892,697 A * | 4/1999 | Brakefield | 708/204 |

(Continued)

FOREIGN PATENT DOCUMENTS

| | | |
|---|---|---|
| EP | 0328721 | 8/1989 |
| EP | 0378830 | 7/1990 |
| EP | 0380099 | 8/1990 |
| WO | 2009017849 | 2/2009 |

OTHER PUBLICATIONS

Saldanha, et al., "Float-to-Fixed and Fixed-to-Float Hardware Converters for Rapid Hardware/Software Partitioning of Floating Point Software Applications to Static and Dynamic Fixed Point CoProcessors" vol. 13, No. 3, Sep. 2009.

(Continued)

*Primary Examiner* — Tan V. Mai

(57) ABSTRACT

In an embodiment, a method performs computer operations using a first fractional precision and a second fractional precision. A computer program has a source variable, a destination variable, and an operation. The source variable has a first dynamic fractional precision, the destination variable has a second dynamic fractional precision that differs from the first dynamic fractional precision, and the operation is related to the source variable and the destination variable. The source variable is aligned to a format of the destination variable, according to the first dynamic fractional precision and the second dynamic fractional precision. The operation is performed using the destination variable and the source variable. A value is assigned to the destination variable according to the operation. In this manner, a single codebase may be written that operates on various hardware that each have different bit precision capabilities, without requiring additional development and verification effort.

20 Claims, 13 Drawing Sheets

(56) References Cited

U.S. PATENT DOCUMENTS

| | | |
|---|---|---|
| 6,131,104 A | 10/2000 | Oberman |
| 6,256,776 B1 | 7/2001 | Melanson |
| 6,460,177 B1 | 10/2002 | Lee |
| 6,941,329 B2 | 9/2005 | Eppler |
| 7,080,364 B2 | 7/2006 | Tang |
| 7,389,499 B2 | 6/2008 | Donovan |
| 7,461,116 B2 | 12/2008 | Allen |
| 7,475,103 B2 | 1/2009 | Novichkov |
| 7,496,908 B2 | 2/2009 | DeWitt, Jr. |
| 8,196,012 B2 * | 6/2012 | Lau et al. ............. 714/758 |
| 2003/0065698 A1 | 4/2003 | Ford |
| 2004/0128331 A1 * | 7/2004 | Hinds et al. ............. 708/204 |
| 2007/0276647 A1 | 11/2007 | Cullen |
| 2009/0077353 A1 | 3/2009 | Devane |

OTHER PUBLICATIONS

Kim, et al., "A Floating-Point to Fixed-Point Assembly Program Translator for the TMS 320C25" IEEE Transactions on Circuits and Systems II: Analog and Digital Signal Processing, vol. 41, No. 11, Nov. 1994, pp. 730-739.

Funk, et al., "Cost-Effective ALU Multiplier Combination" Jan. 1989, disclosed by IBM, Jan. 1, 1989.

IBM "Decimal Floating Point (DFP) Functionality: Technical Preview" 2007.

* cited by examiner

FIG. 2C

252
```
#define A_WHOLE 0
#define A_FRACT 10
#define B_WHOLE 0
#define B_FRACT 10
#define C_WHOLE 8
#define C_FRACT 16
#define N_TAPS 16
```

254
```
...
float a_val[N], b_val[N];
FIXED a[n], b[n];
FIXED c(C_WHOLE, C_FRACT);
int ret_val = 0;
ret_val = get_real_time_input(a_val, b_val);

for(int n=0; n < N_TAPS; n++)
{
    a[n].set_format(A_WHOLE, A_FRACT);
    a[n] = FIXED(a_val[n]);
    b[n].set_format(B_WHOLE, B_FRACT);
    b[n] = FIXED(b_val[n]);

c += a[n]*b[n];
}
...
```

250

256
```
ifdef __CUDACC__ include <cuda_runtime.h>
define DEVICEHOST __device__ __host__
#define DEVICE __device__
#define UINT unsigned
#define LONGLONG long long
define MAX_BITDEPTH 63   //number of magnitude bits else include <math.h>
define __device__
#define __global__
#define __constant__
#define DEVICEHOST
#define DEVICE
#define UINT unsigned int
#define LONGLONG long long
define MAX_BITDEPTH 63   //number of magnitude bits
#define max(a, b)   ((a) <= (b) ? (b) : (a))

#endif
```

```
inline DEVICEHOST FIXED& FIXED::operator=(const FIXED &a)
{
    assign_new_val(aligned_val(a));
    return *this;
}
```

*FIG. 3*  300

```
inline DEVICEHOST LONGLONG FIXED::aligned_val(const FIXED& a, bool truncate) const
{
    int shift = m_fract - a.m_fract;
    if (shift < 0)
    {
        LONGLONG round_val = 0;
        //in rounding mode, if the bit following the last significant one is set, add one to result
        if(!truncate)
        {
            round_val = ((a.m_val >> -(shift + 1)) & 1LL);   //adding the rounding term
        }
        return (a.m_val >> -shift) + round_val;
    }
    else
    {
        return a.m_val << shift;
    }
}
```

*FIG. 4*  400

```
inline DEVICEHOST void FIXED::assign_new_val(LONGLONG new_val)
{
    if (new_val > MAX_VAL())
    {
        m_val = MAX_VAL();
    }
    else if (new_val < MIN_VAL())
    {
        m_val = MIN_VAL();
    }
    else
    {
        m_val = new_val;
    }
}
```

FIG. 5  500

```
inline DEVICEHOST LONGLONG FIXED::MAX_VAL() const       600
{
    // leave one extra bit for the sign
    return (1LL<<(m_whole + m_fract)) - 1;
} inline DEVICEHOST LONGLONG FIXED::MIN_VAL() const       602
{
    // leave one extra bit for the sign
    return -(1LL << (m_whole + m_fract));
}
```

```
inline DEVICEHOST FIXED& FIXED::operator+=(FIXED a)
{
    LONGLONG new_val = aligned_val(a);

new_val += m_val;
    assign_new_val(new_val);

return *this;
}
```

```
inline FIXED operator+(FIXED x, FIXED y)
{
    UINT whole = max(x.get_whole(), y.get_whole()) + 1;
    UINT fract = max(x.get_fract(), y.get_fract());

//if the resultant wordlength exceeds MAX_BITDEPTH, reduce the number of fractional bits
    if( (whole + fract) > MAX_BITDEPTH)
        fract -= ((whole + fract) - MAX_BITDEPTH);

FIXED result(whole, fract);

result = x;
    result += y;

return result;
}
```

```
inline DEVICEHOST FIXED& FIXED::operator*=(FIXED a)    1000
{
  LONGLONG new_val = m_val*a.m_val;

if (new_val & (1LL<<a.m_fract - 1))
    {
      new_val >>= a.m_fract;
      new_val++;
    }
  else
    {
      new_val >>= a.m_fract;
    }
  assign_new_val(new_val);

return *this;
}
```

```
inline FIXED operator*(FIXED x, FIXED y)
{
    UINT whole = x.get_whole() + y.get_whole();
    UINT fract = x.get_fract() + y.get_fract();

//if the resultant wordlength exceeds MAX_BITDEPTH, reduce the number of fractional bits
    UINT shift = 0;
    if( (whole + fract) > MAX_BITDEPTH)
    {
        fract -= ((whole + fract) - MAX_BITDEPTH);
        shift = ((whole + fract) - MAX_BITDEPTH);
    }

FIXED result( whole, fract);
#if USE_REAL_FIXED
    result.set_val((x.get_val()*y.get_val())>>shift);
#else
    result.set_val(x.get_val()*y.get_val());
#endif
    return result;
}
```

```
inline DEVICEHOST FIXED& FIXED::operator-=(FIXED a)
{
    LONGLONG new_val = aligned_val(a);

new_val = m_val - new_val;
    assign_new_val(new_val);

return *this;
}
```

FIG. 12
1200

```
inline FIXED operator-(FIXED x, FIXED y)
{
    UINT whole = max(x.get_whole(), y.get_whole()) + 1;
    UINT fract = max(x.get_fract(), y.get_fract());

//if the resultant wordlength exceeds MAX_BITDEPTH, reduce the number of fractional bits
    if( (whole + fract) > MAX_BITDEPTH)
        fract -= ((whole + fract) - MAX_BITDEPTH);

FIXED result(whole, fract);

result = x;
    result -= y;

return result;
}
```

FIG. 13
1300

```
inline DEVICEHOST FIXED& FIXED::operator/=(FIXED a)
{
    LONGLONG new_val;

if( m_val == 0)
    {
        new_val = 0LL;
    }
    else if( a.m_val == 0) //divide by zero case
    {
        new_val = 0x7FFFFFFFFFFFFFFF; //(1LL << 63) - 1;
    }
    else
    {
        new_val = (m_val << a.m_fract) / a.m_val;
    }
    assign_new_val(new_val);
    return *this;
}
```

```
inline FIXED operator/(FIXED x, FIXED y)
{
    UINT fract = x.get_fract();
    UINT whole = MAX_BITDEPTH - x.get_fract();

FIXED result(whole, fract);

result = x;
    result /= y;                        // divide by zero case handled in the /= operator return result;
}
```

FIG. 15
1500

```
DEVICEHOST void reset_format(UINT whole, UINT fract, bool truncate = false)
{
    FIXED tmp(m_whole, m_fract, m_val);

set_format( whole, fract);
    assign_new_val(aligned_val(tmp, truncate));
}
```

FIG. 16
1600

```
inline FIXED operator-(FIXED x)                    1700
{
    FIXED result;
    result.set_format(x.get_whole(), x.get_fract());
    result.set_val(-1*x.get_val());

return result;
}
```

FIG. 17

```
inline DEVICEHOST bool FIXED::operator==(FIXED a) const    1900
{
    LONGLONG new_val = aligned_val(a);

return m_val == new_val;
}
```

FIG. 18

```
inline DEVICEHOST bool FIXED::operator!=(FIXED a) const    2000
{
    return !(*this == a);
}
```

FIG. 19

SYSTEM AND METHOD OF DYNAMIC PRECISION OPERATIONS

CROSS REFERENCE TO RELATED APPLICATIONS

This Application claims the benefit of priority to related, Provisional U.S. Patent Application No. 61/392,314 filed on 12 Oct. 2010, hereby incorporated by reference in its entirety.

BACKGROUND

The present invention relates to computer programming, and in particular, to programming devices that implement a variety of numerical precisions.

Unless otherwise indicated herein, the approaches described in this section are not prior art to the claims in this application and are not admitted to be prior art by inclusion in this section.

It is common for software developers to provide library binaries compiled to a variety of diverse platforms. For example, a library may be compiled for an Intel processor, an Nvidia graphics processing unit (GPU), or a fixed-point digital signal processor (DSP). Developers want to take full advantage of a platform's specific architecture features. For example, to use a floating-point accelerator, or in fixed-point DSPs to take full advantage of a higher-precision architecture (say use 16 bits of precision in device A versus using 12 bits of precision in device B). Sometimes a developer may even provide source code that needs to be ported to an unknown, proprietary architecture, such as the processor for a high definition television (HDTV), a digital video disk (DVD) player or DVD recorder. Optimizing an algorithm for a specific architecture takes time, development effort, and verification effort.

In general, there are two parts in the platform-dependent code generation problem: 1) a platform-dependent makefile, and 2) platform-dependent code.

A "makefile" is a file that is used by a "make" utility for automatically building executable programs and libraries. "Cmake" and "GNU Make" are examples of well known cross-platform build system generators that can help developers customize how to build executables for multiple platforms using a common source code tree. The makefile then generates the appropriate executable code for a given platform.

One way to address the generation of platform-dependent code is by writing a single program that includes separate code for each architecture. Then during compilation, the compiler selects the appropriate code portion to use for a given platform. For example, consider the case of writing code to be used on both a fixed point architecture and a floating point architecture. One may have two separate source code trees for each architecture, or may define separate code modules within a single file. For example, separate code modules may be defined as follows:

```
#ifdef FLOAT
    // comment: include here C-code for a floating point architecture
#endif
#ifdef FIXED16
    // comment: include here C-code for a fixed 16-bit architecture
#endif
```

The "FLOAT" code tree is to be used for the floating point architecture, and the "FIXED16" code tree is to be used for the fixed point architecture. Then, on a makefile one uses the -DFLOAT or -DFIXED16 options to direct the compiler to use the appropriate code.

Another way to address the generation of platform-dependent code is described in U.S. Pat. No. 6,460,177. In the '177 patent at FIG. 3, a three-stage code modification and compilation approach is described to convert a floating point representation to a fixed point representation. First, the floating point code is compiled and run to generate statistics (see 22 in FIG. 3). Second, based on the statistics, the fixed-point representations are prescribed (see 23 in FIG. 3). Third, the fixed point code resulting from the prescribed fixed-point representations is compiled, run and tested (see 27 in FIG. 3).

Another alternative is to use base-10 instead of base-2 to represent values, as described in the document Decimal Floating Point (DFP) Functionality: Technical Preview (2007) by IBM Corp. This technique improves the accuracy of floating point representations by eliminating the inaccuracies of translating between human readable base-10 and machine oriented base-2 numbers.

SUMMARY

The above-described methods have a number of shortcomings. First, one needs to explicitly create code for each target architecture. This takes time. Second, any change (say bug fix) for one target has to be copied and propagated to all other targets. This code maintenance takes time, as well as increases the chances of further bugs due to inaccurate adjustment when the code is copied and propagated to another target.

In response to the above-noted shortcomings, an embodiment of the present invention implements a method for maintaining platform-dependent code: the use of FIXED, a new fixed point arithmetic "class" that has variable precision. Within a maximum of 64 bits (a "long long") according to an embodiment, the FIXED class allows fixed point numbers to be represented using "a" bits for an integer part and "b" bits for a fractional part, represented as (a,b). The FIXED class supports a variety of operations among this new set of numbers, including shifting, addition, multiplication, division, square root, power, float to (a,b) translation, and operations with mixed precision. (As an example of an operation with mixed precision, consider (a3,b3)=(a1,b1)+(a2,b2), which is useful in FPGA/RTL [field programmable gate array/register transfer level] verification.)

Furthermore, the FIXED class allows programmers to dynamically change the precision of the objects as they are used or reused in the program. For example, one part of the program may use floating point precision for a variable, another part may use (2,14) fixed point precision for the variable, and another part may use (4,12) fixed point precision for the variable.

In addition, based on a switch during compile time, the FIXED class can be used for both floating point and fixed point architectures, making the codebase capable for both floating point and variable precision fixed point; this feature is helpful when prototyping new digital signal processing algorithms.

According to an embodiment, a method performs computer operations using a first fractional precision and a second fractional precision. A computer program has a source variable, a destination variable, and an operation. The source variable has a first dynamic fractional precision, the destination variable has a second dynamic fractional precision that differs from the first dynamic fractional precision, and the operation is related to the source variable and the destination variable. The source variable is aligned to a format of the destination variable, according to the first dynamic fractional precision and the second dynamic fractional precision. The operation is performed using the destination variable and the source variable. A value is assigned to the destination variable according to the operation.

According to an embodiment, the variables may have dynamic precision that includes a dynamic integer precision and a dynamic fractional precision.

According to an embodiment, various operations may be performed between the variables, including an assignment operation, an addition operation, a compound addition operation, a subtraction operation, a compound subtraction operation, a multiplication operation, a compound multiplication operation, a division operation, a compound division operation, a conversion operation, an equality test operation and an inequality test operation.

An embodiment has a number of advantages as compared to existing solutions, including ease of maintenance, speed of development, and mixed mode execution capability. Regarding ease of maintenance, developers need to maintain a single, much simpler than before, source tree. Any changes to the code are made only once. During "make" one simply specifies the bit-accuracy of the target architecture and the FIXED Class takes care of the rest. Regarding speed of development, for example, one can develop a prototype algorithm in floating point, but then easily translate it to a fixed-point architecture suitable for an FPGA. Regarding mixed mode execution, a user may define which modules are to be executed in floating point and which modules are to be executed in fixed point. This allows algorithms to be executed in mixed mode, as long it is allowed by the target architecture (for example, RTL units that use specialized floating point blocks for specific tasks). Users can also take advantage of other hardware accelerators, such as a power/square-root/log unit, via a simple switch (instead of having to rewrite source code that was not originally written to take advantage of the hardware accelerator). Users can also select from a range of options for operation specifics like rounding modes and standard dependent math operations (e.g., IEEE divide rounding) using the options provided by the FIXED Class and application programming interface (API).

The following detailed description and accompanying drawings provide a further understanding of the nature and advantages of the present invention.

BRIEF DESCRIPTION OF THE DRAWINGS

FIG. 2C shows example code segments that are used when performing the process of FIG. 2A.

FIG. 3 is a listing showing a code portion of an example implementation of the assignment operation in C++.

FIG. 4 is a listing showing a code portion of an example implementation of the align function written in C++, called "align_val( )".

FIG. 5 is a listing showing a code portion of an example implementation of the assign function written in C++, called "assign_new_val( )".

FIG. 6 is a listing showing code portions of an example implementation of defining the maximum and minimum values allowed by the implementation, written in C++.

FIG. 7 is a listing showing a code portion of an example implementation of the compound addition operation written in C++.

FIG. 8 is a listing showing a code portion of an example implementation of the addition operation written in C++.

FIG. 11 is a listing showing a code portion of an example implementation of the multiplication operation written in C++.

FIG. 12 is a listing showing a code portion of an example implementation of the compound subtraction operation written in C++.

FIG. 13 is a listing showing a code portion of an example implementation of the subtraction operation written in C++.

FIG. 14 is a listing showing a code portion of an example implementation of the compound division operation written in C++.

FIG. 15 is a listing showing a code portion of an example implementation of the division operation written in C++.

FIG. 16 is a listing showing a code portion of an example implementation of the conversion operation written in C++.

FIG. 17 is a listing showing a code portion of an example implementation of the unary subtraction operation written in C++.

FIG. 18 is a listing showing a code portion of an example implementation of the equality test operation written in C++.

FIG. 19 is a listing showing a code portion of an example implementation of the inequality test operation written in C++.

DETAILED DESCRIPTION

Figure 1:
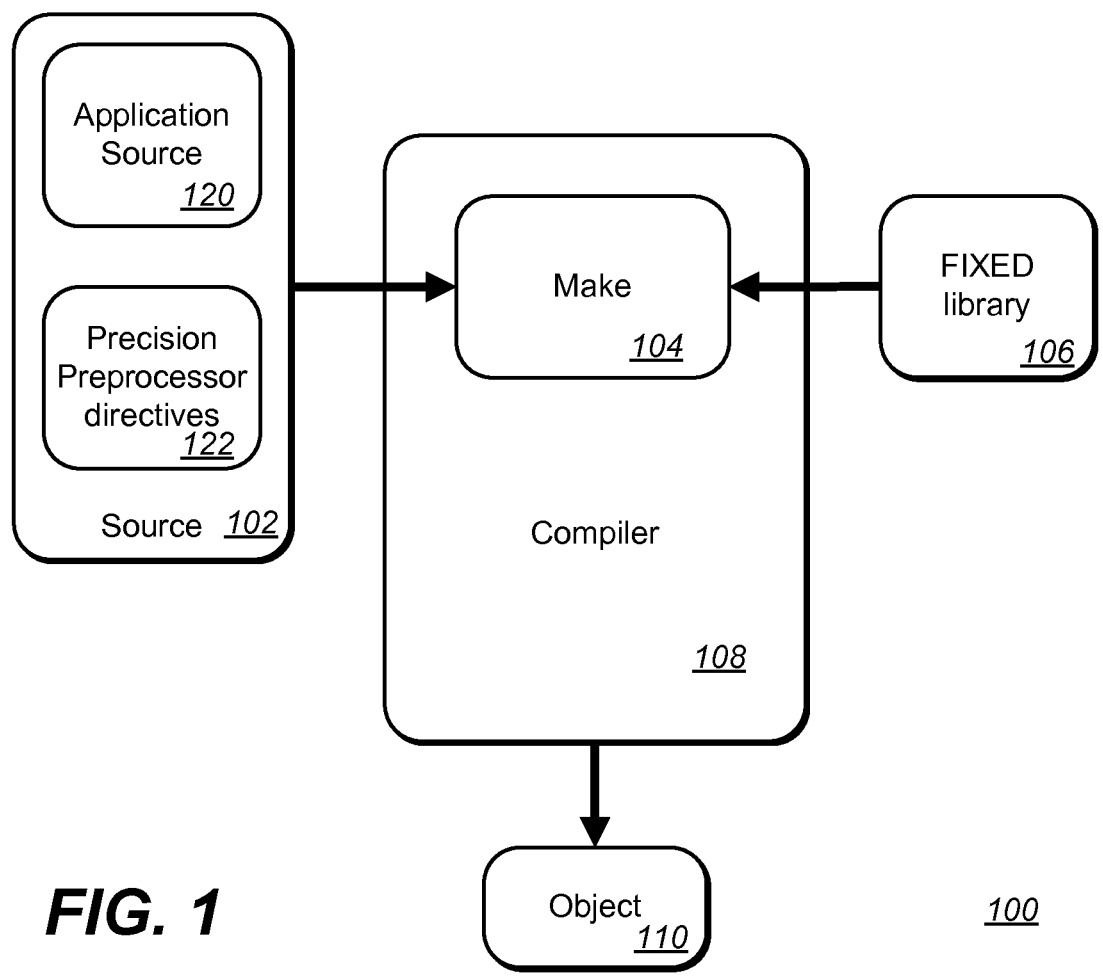
FIG. 1 is a block diagram showing the relationship between various components that implement precision mode switching, according to an embodiment.

Described herein are techniques for programming using dynamic precision. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

As discussed above, the FIXED class according to an embodiment uses fixed point variables defined using a maximum of 64 bits (for example, 63 bits for the magnitude and 1 bit for the sign), with the format represented as (a1,b1). In this format, a1 is the number of whole (integer) bits and b1 is the number of fractional bits. For example, the variable x may have the format (4,12); thus 4 bits are available to represent the integer portion of the value stored in x, and 12 bits are available to represent the fractional portion of the value stored in x. The maximum number of bits may be changed in other embodiments as desired.

An embodiment of the present invention implements "dynamic" precision. (This may also be referred to as "adjustable" precision.) As discussed above, a fixed point variable has an integer part and a fractional part; the variable has dynamic precision when the number of bits allocated to or between the integer part and the fractional part may be changed. For example, the variable x may have the format (4,12); the variable x may be adjusted to have the format (8,8), to have the format (2,14), or to have the format (20,12). When the fractional part is dynamic, the variable x may be said to have dynamic fractional precision. When the integer part is dynamic, the variable x may be said to have dynamic integer precision. The integer part and the fractional part together may be less than or equal to the maximum number of bits defined for the variable (or defined by the particular implementation).

An embodiment of the present invention is implemented in the C++ language, where the FIXED class is implemented as a header file "fixed.h" and a header program "fixed.cpp", and where the source code is written with the FIXED class in mind. C++ is an object-oriented programming language. Alternative embodiments may use programming languages other than C++, or non-object-oriented programming languages. An alternative embodiment may implement the FIXED class, or equivalent operations, as part of the compiler itself.

FIG. 1 is a block diagram showing the relationship between various components 100 that implement precision mode switching, according to an embodiment. The components 100 may be computer programs and data files that may be stored and executed by a computer system (as described in more detail with reference to FIG. 20). The components 100 include source code 102, a make component 104, a FIXED class component 106, a compiler 108, and object code 110.

The source code 102 corresponds to the program to be compiled. The source code 102 may be a program for controlling a DSP or FPGA, or components of a DSP or FPGA. According to an embodiment, the source code 102 is written in the C++ language. The source code 102 includes dynamic precision variables in the format (a,b) as discussed above. The source code 102 also includes operations on and between the dynamic precision variables. The source code 102 may include a command to "include" the FIXED class component 106.

More specifically, the source code 102 may be viewed as including an application source 120 and a set of preprocessor precision directives 122. The application source 120 corresponds to the computer program that the programmer writes (that is then compiled into the object code 110 that controls the operation of a particular device). The preprocessor precision directives 122 define the specific wordlengths of FIXED objects in the application source 120 (and the source code 102). The preprocessor precision directives 122 determine the dynamic precision operations in the source code 102. Thus, for implementing the same source code 102 on a different architecture device, only the preprocessor precision directives 122 need to be changed, and the application source 120 may remain the same.

The FIXED class component 106 contains the files that the make component 104 uses when performing the "make" function on the source code 102. According to an embodiment, the FIXED class component 106 includes the header file "fixed.h" and the header program "fixed.cpp". The header file "fixed.h" contains commands that generally define the operations and data structures of the FIXED class component 106. The header program "fixed.cpp" then uses the information in the header file "fixed.h", for example via an "include" statement, to define the various tasks that the make component 104 is to perform when executing the make on the source code 102.

In another embodiment, the FIXED class component 106 may be part of a software library with an API that defines the methods that may be used in the source code 102. The software library may encapsulate the definitions and implementations of the various methods in the API to create a shared object (dynamic library) or an archive (static library).

The make component 104 performs the "make" function as part of compiling the source code 102. The make component 104 uses the information in the FIXED class component 106 to replace the dynamic precision variables and operations in the source code 102 with the more traditional variables and functions expected by the compiler 108. More specifically, the header program "fixed.cpp" may include various "inline" segments that direct the make component 104 to replace portions of the source code 102 that use the dynamic precision variables and operations with the more traditional variables and functions expected by the compiler 108. A build utility such as GNU make may be used to implement the make component 104.

The compiler 108 compiles the output of the make component 104 to generate the object code 110. The programmer may direct the compiler 108 to compile the source code in a certain way so that the object code 110 is compiled appropriately for a specific target architecture. For example, the compiler 108 may compile the object code 110 to use floating point variables and operations in floating point mode (for example for debugging the source code 102). A compiler such as the GNU C Compiler or the GNU C++ Compiler may be used to implement the compiler 108.

The object code 110 results from the compiler 108 compiling the source code 102.

Figure 2A:
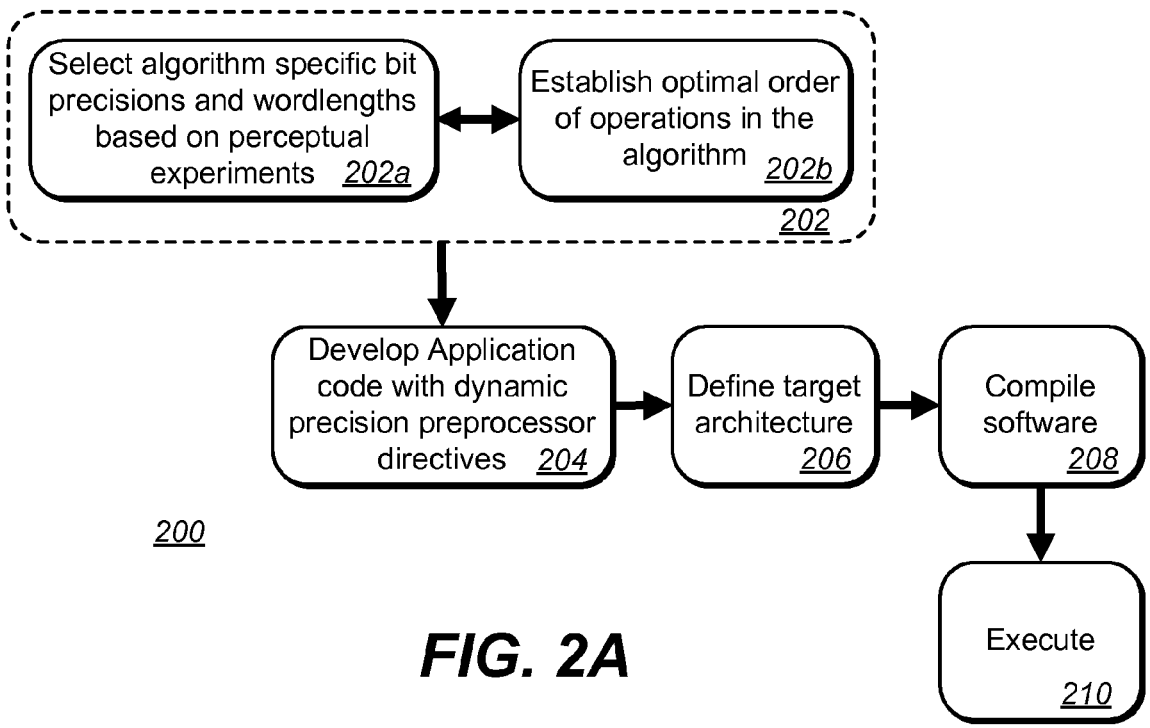
FIGS. 2A-2B are flowcharts that illustrate the general framework of a method of generating the object code from the source code by the components of FIG. 1, according to an embodiment.
Figure 2B:
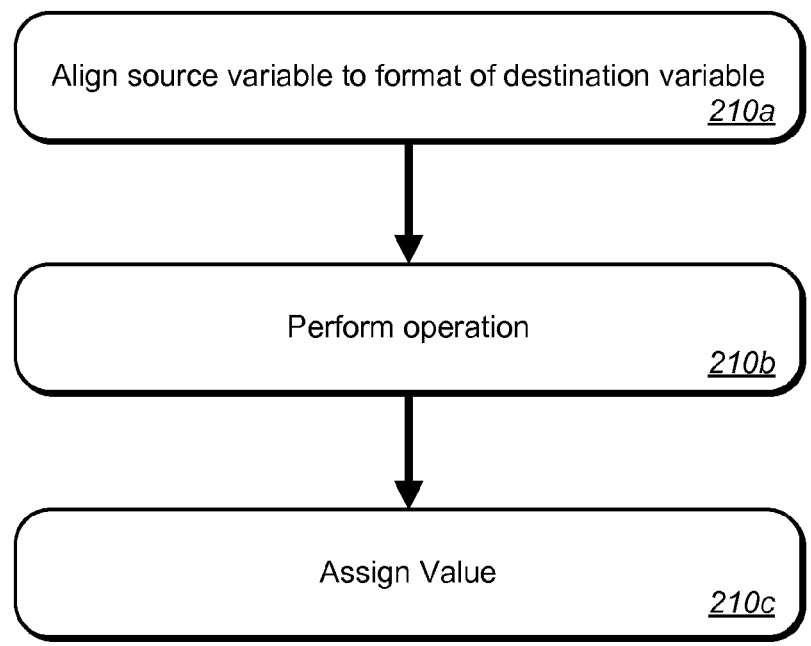

FIGS. 2A-2B are flowcharts that illustrate the general framework of a method 200 of generating the object code 110 from the source code 102 by the components 100 (see FIG. 1), according to an embodiment. The method 200 may be implemented by a computer system (see FIG. 20) that, for example, stores the source code 102 and executes the compiler 108. FIG. 2A is a flowchart showing the overall process, and FIG. 2B shows some more specific details.

In general, the method 200 converts computer operations from a first fractional precision to a second fractional precision. For example, the source code 102 may have two variables x and y that have different dynamic precisions (a1,b1) and (a2,b2), and the method 200 may be used to control how the computer system behaves when performing operations on the variables x and y.

At 202, data and operation analysis is performed. More specifically, 202 includes two general operations 202a and 202b. At 202a, program-specific bit precisions and word lengths are selected based on perceptual experiments. For example, for expected data values, particular bit precisions and word lengths are evaluated to verify that they produce acceptable results for a given computer program. As a more specific example, assume the computer program is to perform filtering on data; the bit precisions and word lengths are then selected such that the computer program produces acceptable results over the expected range of the data.

At 202b, the optimal order of performing operations in the computer program is established. In general, 202b orders the operations in the computer program in a way that recognizes the bit precisions and word lengths selected in 202a. For example, if the program is multiplying three variables in which the order does not matter in the abstract, then 202b orders them in a way that accounts for the bit precisions and word lengths. More specifically, if two of the variables have a high bit precision and the other has a low bit precision, the program is ordered such that the two high precision variables are multiplied together, then the result is multiplied by the low precision variable. Similarly, if two of the variables have long word lengths and the other variable has a short word length, the program is ordered such that the two long word length variables are multiplied together, then the result is multiplied by the short word length variable.

Various methods may be used to implement 202. For example, U.S. Pat. No. 6,460,177 describes a process that includes generating statistics in order to prescribe the fixed-point representations (see 22 and 23 in FIG. 3).

At 204, the application code with dynamic precision preprocessor directives is developed (see 102 in FIG. 1).

At 206, the target architecture is defined. For example, a specific hardware device may have a floating point unit, or may have 16 total bits available for fixed point operations, or may have a power unit hardware accelerator, etc. This information may be provided via command line switches.

At 208, the computer program is compiled according to the information indicating the target architecture. For example, the compiler 108 compiles the source code 102, using the functions defined in the FIXED library 106, to generate the object code 110 (see FIG. 1).

At 210, the computer program is executed. For example, the object code 110 (see FIG. 1) may be executed on the particular target architecture (see 206 in FIG. 2).

FIG. 2B shows more details of the execution operation of 210 according to an embodiment. In general, during execution, the target architecture implements the functions of the FIXED class as used in the computer program. These functions are then used when performing operations between variables having different dynamic precisions.

More specifically, the method of FIG. 2B performs computer operations using a first fractional precision and a second fractional precision. For example, the source code 102 may have two variables x and y that have different dynamic precisions (a1,b1) and (a2,b2), and the method of FIG. 2B may be used to control how the target architecture behaves when performing operations on the variables x and y.

The source code 102 corresponds to a stored computer program. The computer program has a source variable, a destination variable, and an operation. The source variable has a first dynamic fractional precision, the destination variable has a second dynamic fractional precision that differs from the first dynamic fractional precision, and the operation is related to the source variable and the destination variable. For example, the source code 102 (see FIG. 1) may include the statement "x=y" (referred to as an assignment operation), where x has precision (10,10) and y has precision (5,5).

At 210a, the source variable is aligned to a format of the destination variable, according to the first dynamic fractional precision and the second dynamic fractional precision. The specifics of the alignment depend upon the particular operation. For example, in the assignment operation "x=y" where x has precision (10,10) and y has precision (5,5), the alignment depends on the fractional 10 bits of x and the fractional 5 bits of y. Alignment is more fully described below.

At 210b, the operation is performed using the destination variable and the source variable. For example, for the statement "x=y", the operation is an assignment operation. Various operations are described in more detail below.

At 210c, a value is assigned to the destination variable according to the operation. For example, for the statement "x=y", the value of the variable y is assigned to the variable x. Assignment is more fully described below.

FIG. 2C shows example code segments 250 that are used when performing the process 200 of FIG. 2A. The code segments include example bit precision definitions 252 (compare 202a in FIG. 2A), example application code 254 (compare 204 in FIG. 2A), and example target architecture definitions 256 (compare 206 in FIG. 2A).

The bit precision definitions 252 define the number of whole and fractional bits for the variables used in the process 200. For example, the bit precision definitions 252 define the number of whole and fractional bits for three variables a, b and c. The bit precision definitions 252 may also define other parameters used in the process 200. For example, the bit precision definitions 252 define the number of taps for the filter function implemented by application code 254.

The application code 254 controls a hardware device to perform various functions. For example, the application code 254 controls the hardware device to implement a finite impulse response filter with N taps. More specifically, the application code 254 controls the hardware device to implement the following function:

$$c = \sum_{n=0}^{N-1} a_n * b_n$$

The target architecture definitions 256 define the target architecture. For example, the target architecture definitions 256 instruct the compiler 108 (see FIG. 1) to include the compute unified device architecture (CUDA) runtime header when that target architecture is specified.

Operations

Various operations (see 206 in FIG. 2) may be performed that are related to the dynamic precision variables. These operations may be referred to as "overloaded" operations: In a C++ implementation, an operator is "overloaded" when a user-defined class defines the operator to have special meanings. According to an embodiment, these special meanings relate to the dynamic precision of the variables. According to an embodiment, these operators are defined in the FIXED class, specifically in the "fixed.cpp" header program. According to an embodiment, the operators include assignment, addition, compound addition assignment, multiplication, compound multiplication assignment, subtraction, compound subtraction assignment, division, compound division assignment, apply gamma, remove gamma, square root, power, and conversion between floating point and dynamic point. (Note that the compound operations may be mentioned without the "assignment" phrase for brevity, e.g. "compound addition" means "compound addition assignment".) The following sections detail these operations (including their related functions, such as the align function and the assign function).

Assignment Operation

In general, the assignment operation assigns the value of the source variable as the value of the destination variable. The assignment operation is represented by the equals sign "=", which may also be referred to as the "assignment operator". The assignment operation includes the align function (see 204 above, as well as the "align function" section below) and the assign function (see 208 above, as well as the "assign function" section below), which operate according to the dynamic fractional precisions of the source variable and the destination variable.

FIG. 3 is a listing showing a code portion 300 of an example implementation of the assignment operation in C++. The code portion 300 may be part of the header program "fixed.cpp". In general, in the assignment operation, for binary point alignment, justification of the value of objects is based on the number of fractional bits (e.g., the dynamic fractional precision).

Consider the example assignment operation "x=y", where x has format (a1,b1) and y has format (a2,b2). First, y is aligned to the format of x. More specifically, the number of fractional bits in x and y are compared. In the code portion 300, this is performed by the aligned_val( ) function. For more details on this function, see the section "Align Function" below.

Second, the value of y is assigned to x. This maybe referred to as the "assignment function", in which the value of y may be adjusted to reside within the dynamic range defined for x. Note that the "assignment function" differs from the "assignment operation" in that the assignment function is part of the assignment operation. More specifically, the value of y is adjusted according to the difference between the dynamic integer precisions of x and y (i.e., the assignment "operation"), and the adjusted value of y is assigned to x (i.e., the assignment "function"). In the code portion 300, the assignment function is performed by the assign_new_val( ) function. For more details on this function, see the section "Assign Function" below.

Align Function

FIG. 4 is a listing showing a code portion 400 of an example implementation of the align function written in C++, called "align_val( )". The code portion 400 may be part of the header program "fixed.cpp". In general, in the align function, the number of fractional bits in two variables are compared, and various actions are taken according to the difference therebetween. (In the context of the method 200 of FIG. 2, the align function is at 204.)

In general, the code portion 400 operates as follows. Consider the variables x and y, where x has format (a1,b1) and y has format (a2,b2). If the number of fractional bits in y is smaller than that in x, i.e. b1>b2, then multiply the value of y by pow(2, b1-b2). In the code portion 400, this is implemented in the "else" path by the operation "return a.m_val<<shift", with the "shift" calculation performed at the top by the function "int shift=m_fract-a.m_fract". (Note that when "shift" is 0, the "else" path is taken, but the value is shifted by zero. That is, when b1 and b2 are equal, there is no need to align x and y.) More generally, the value of y is increased according to the difference in fractional precisions.

If the number of fractional bits in x is smaller than that in y, i.e. b1<b2, then based on the specified rounding mode (see the section "Rounding Mode" below), either truncate or round the additional precision bits in y while dividing the value of y by pow(2, a1+b1). More generally, the value of y is decreased according to the difference in fractional precisions, the fractional precision of y is reduced to match that of x, and the value of y is adjusted according to the specified rounding mode.

Note that the specifics of the align function depend upon the operation performed. In this section, the assign function was described with reference to the assignment operation. When a particular operation includes additional steps during alignment, those differences will be detailed along with the description of that operation (below).

Rounding Mode

In the code portion 400, the rounding mode is implemented by the "truncate" Boolean variable. If "truncate" is false, then the rounding value "round_val" is calculated (otherwise "round_val" is zero). The rounding value (zero or not) is then added to the shifted value of y.

Assign Function

FIG. 5 is a listing showing a code portion 500 of an example implementation of the assign function written in C++, called "assign_new_val( )". The code portion 500 may be part of the header program "fixed.cpp". In general, in the assign function, the appropriate value is assigned to the destination variable according to the operation. (In the context of the method 200 of FIG. 2, the assign function is at 208.)

In general, the code portion 500 operates as follows. If the value to be assigned to the variable is above the maximum value (or below the minimum value) defined by the implementation, the value assigned is the maximum defined value (or the minimum defined value); otherwise the value is assigned as-is. (The value results from the operation performed; see for example 206 in FIG. 2.) The maximum and minimum defined values may be set as described below.

FIG. 6 is a listing showing code portions 600 and 602 of an example implementation of defining the maximum and minimum values allowed by the implementation, written in C++. The code portions 600 and 602 may be part of the header program "fixed.cpp". The code portions 600 and 602 perform their calculations based on the defined values for "m_whole" and "m_fract", which are the defined number of whole digit bits and fractional digit bits, respectively, for the variable. The variables "m_whole" and "m_fract" may be defined in the header file "fixed.h".

Compound Addition Operation

FIG. 7 is a listing showing a code portion 700 of an example implementation of the compound addition operation written in C++. The code portion 700 may be part of the header program "fixed.cpp".

In general, the code portion 700 operates as follows. Consider the operation "x+=y", where x has the format (a1,b1) and y has the format (a2,b2). First, y is aligned to the format of x, using the function "aligned_val( )" (see above with reference to FIG. 4). As a result, the value of y now has the same format as that of x. Second, the operation x+=y is performed (i.e., new_val+=m_val). Third, the resulting new value of x may be clipped to reside within the format defined for x, using the assign function "assign_new_val( )" (see above with reference to FIG. 5).

Addition Operation

FIG. 8 is a listing showing a code portion 800 of an example implementation of the addition operation written in C++. The code portion 800 may be part of the header program "fixed.cpp".

In general, the code portion 800 operates as follows. Consider the operation "z=x+y", where x has format (a1,b1), y has format (a2,b2) and z has format (a3,b3). First, a temporary result ("result" in the code portion 800) is formatted as (max (a1, a2)+1, max(b1, b2)). If the total number of bits in the format of "result" exceeds the maximum number of bits for the implementation (e.g., 63), then the number of fractional bits is reduced so that the resulting number of bits in the format of "result" does not exceed the maximum. This step is accomplished by the statement "FIXED result(whole, fract)", where "FIXED" is the operation to create the "result" object according to the FIXED class, and "whole" and "fract" are the number of whole bits and fractional bits (respectively) for the temporary result, based on the formats of x and y.

Second, the temporary result is assigned the value of x. This step is accomplished by the statement "result=x". Notice that this statement includes the assignment operator "=", thus this statement may be implemented by the assign function "assign_new_val( )" (see above with reference to FIG. 5).

Third, y is added to the temporary result. This step is accomplished by the statement "result+=y". Notice that this statement includes the compound addition operator "+=", thus this statement may be implemented by the compound addition operation (see above with reference to FIG. 7).

Fourth, the temporary result is assigned to z. This step is accomplished by the assignment operator ("="). When the result is assigned to z, the format conversion is implicit.

Figures 9, 10:
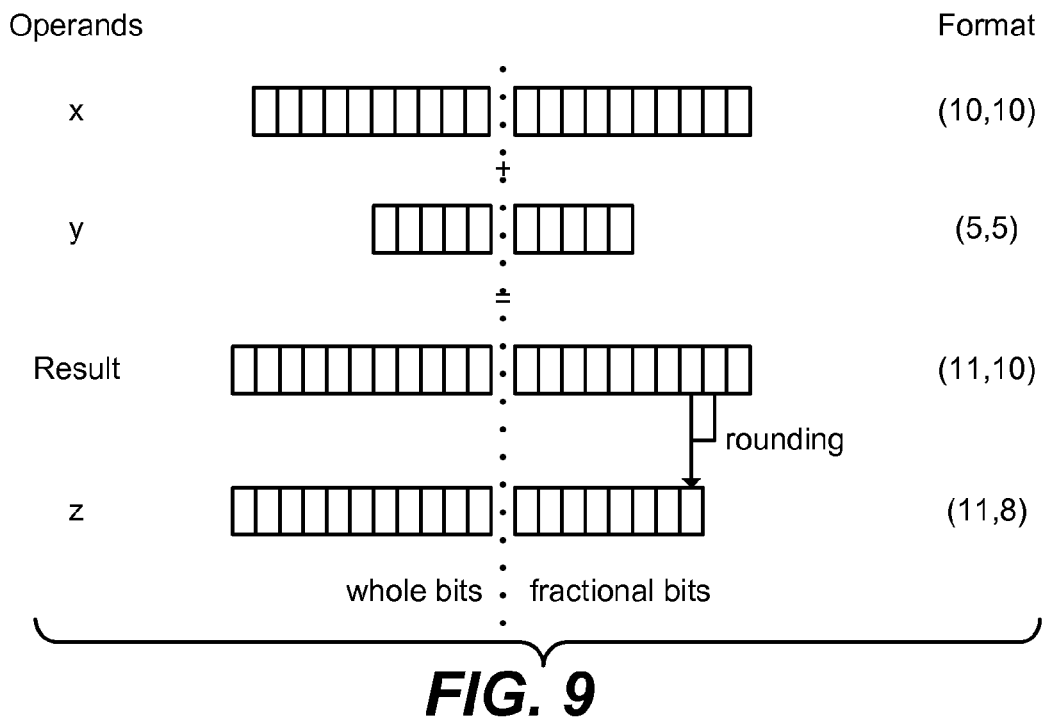
FIG. 9 is a diagram showing an example of the addition operation.
FIG. 10 is a listing showing a code portion of an example implementation of the compound multiplication operation written in C++.

FIG. 9 is a diagram showing an example of the addition operation. Consider the operation "z=x+y", where x has format (10,10), y has format (5,5) and z has format (11,8). As described above in FIG. 8, the temporary result has format (11,10). When the temporary result is assigned to z, rounding occurs (as part of the alignment function in the assignment operation, as described in FIGS. 3-4).

Compound Multiplication Operation

FIG. 10 is a listing showing a code portion 1000 of an example implementation of the compound multiplication operation written in C++. The code portion 1000 may be part of the header program "fixed.cpp".

In general, the code portion 1000 operates as follows. Consider the operation "x*=y", where x has format (a1,b1) and y has format (a2,b2). First, the value of x is multiplied by y and stored in a temporary variable. This step is accomplished by the statement "new_val=m_val*a.m_val".

Second, the value of the temporary variable is shifted to the right by the number of fractional bits in y, and the shifted value is assigned to x. In the code portion 1000, the shifting is accomplished by the "if . . . else . . . " statement, and the assignment is accomplished by the "assign_new_val (new_val)" statement.

Multiplication Operation

FIG. 11 is a listing showing a code portion 1100 of an example implementation of the multiplication operation written in C++. The code portion 1100 may be part of the header program "fixed.cpp".

In general, the multiplication operation includes two implicit operations. The first implicit operation is multiplication, e.g. "result=x*y". The second implicit operation is assignment, e.g. "z=result".

In general, the code portion 1100 operates as follows. Consider the operation "z=x*y", where x has format (a1,b1), y has format (a2,b2) and z has format (a3,b3). First, the "result" object is created according to the number of whole and fractional bits in x and y, i.e. ((a1+a2),(b1+b2)). This step is accomplished by the statement "FIXED result(whole, fract)", where "whole" and "fract" are calculated as shown in the code portion 1100, and where the number of fractional bits may be reduced as needed to stay within the maximum number of bits "MAX_BITDEPTH" defined for the implementation, e.g. 63 bits.

Second, the values of x and y are multiplied together, and the resulting value is assigned to the "result" object. This step is accomplished by the statement "result.set_val((x.get_val( )*y.get_val( ))>>shift)", where "shift" is the number of fractional bits that get discarded when the product wordlength exceeds MAX_BITDEPTH. (In floating point operation this shift operation would return an error, hence the conditional if/else.)

Third, the temporary result is assigned to z. This step is accomplished by the assignment operator ("="). When the result is assigned to z, the format conversion is implicit.

Compound Subtraction Operation

FIG. 12 is a listing showing a code portion 1200 of an example implementation of the compound subtraction operation written in C++. The code portion 1200 may be part of the header program "fixed.cpp".

In general, the code portion 1200 operates as follows. Consider the operation "x-=y", where x has the format (a1, b1) and y has the format (a2,b2). First, y is aligned to the format of x, using the function "aligned_val( )" (see above with reference to FIG. 4). As a result, the value of y now has the same format as that of x. Second, the operation x-=y is performed (i.e., new_val=m_val−new_val). Third, the resulting new value of x may be clipped to reside within the format defined for x, using the assign function "assign_new_val( )" (see above with reference to FIG. 5).

Subtraction Operation

FIG. 13 is a listing showing a code portion 1300 of an example implementation of the subtraction operation written in C++. The code portion 1300 may be part of the header program "fixed.cpp".

In general, the code portion 1300 operates as follows. Consider the operation "z=x−y", where x has format (a1,b1), y has format (a2,b2) and z has format (a3,b3). First, a temporary result ("result" in the code portion 1300) is formatted as (max(a1, a2)+1, max(b1, b2)). If the total number of bits in the format of "result" exceeds the maximum number of bits for the implementation (e.g., 63), then the number of fractional bits is reduced so that the resulting number of bits in the format of "result" does not exceed the maximum. This step is accomplished by the statement "FIXED result(whole, fract)", where "FIXED" is the operation to create the "result" object according to the FIXED class, and "whole" and "fract" are the number of whole bits and fractional bits (respectively) for the temporary result, based on the formats of x and y.

Second, the temporary result is assigned the value of x. This step is accomplished by the statement "result=x". Notice that this statement includes the assignment operator "=", thus this statement may be implemented by the assign function "assign_new_val( )" (see above with reference to FIG. 5).

Third, y is subtracted from the temporary result. This step is accomplished by the statement "result-=y". Notice that this statement includes the compound subtraction operator "-=", thus this statement may be implemented by the compound subtraction operation (see above with reference to FIG. 12).

Fourth, the temporary result is assigned to z. This step is accomplished by the assignment operator ("="). When the result is assigned to z, the format conversion is implicit.

Compound Division Operation

FIG. 14 is a listing showing a code portion 1400 of an example implementation of the compound division operation written in C++. The code portion 1400 may be part of the header program "fixed.cpp".

In general, the code portion 1400 operates as follows. Consider the operation "x/=y", where x has the format (a1,b1) and y has the format (a2,b2). First, an if/else structure is evaluated for three cases. Case one, if x=0, the temporary result "new_val" is given the value of zero. (In a 64 bit implementation, the value of zero may be represented as "0LL", which is 64 bits (long-long) representing zero.) Case two, if y=0, "new_val" is given the largest positive integer value defined for the implementation. (In a 64 bit implementation, the largest positive integer value may be represented by 0x7FFFFFFFFFFFFFFF in hexadecimal.) Case three, if neither x=0 nor y=0, division can occur normally according to the statement "new_val=(m_val<<a.m_fract)/a.m_val". More specifically, the statement in case three normalizes both the numerator and the denominator prior to the divide operation to obtain the correct integer result. a.m_val has a.m_fract fractional bits. Since the numerical value returned by a.m_val is an integer, the numerator in this expression needs to be left shifted by the number of fractional bits in the denominator.

Second, the result of the division "new_val" is assigned to x. This step is accomplished by the statement "assign_new_val(new_val)", which implements the assign function described above (see FIG. 5).

Division Operation

FIG. 15 is a listing showing a code portion 1500 of an example implementation of the division operation written in C++. The code portion 1500 may be part of the header program "fixed.cpp".

In general, the code portion 1500 operates as follows. Consider the operation "z=x/y", where x has the format (a1, b1), y has the format (a2,b2) and z has the format (a3,b3). First, a temporary result ("result" in the code portion 1500) is formatted as ((63-b1),b1). That is, "result" is formatted to have the same number of fractional bits as x, and to have as many whole bits as to fill out the object (63 total bits of magnitude in this implementation). This step is accomplished by the statement "FIXED result(whole, fract)", where "FIXED" is the operation to create the "result" object according to the FIXED class, and "whole" and "fract" are the number of whole bits and fractional bits (respectively) for the temporary result, based on the format of x and the maximum number of bits, and as described above regarding the compound division operation.

Second, the temporary result is assigned the value of x. This step is accomplished by the statement "result=x". Notice that this statement includes the assignment operator "=", thus this statement may be implemented by the assign function "assign_new_val( )" (see above with reference to FIG. 5).

Third, the temporary result is divided by y. This step is accomplished by the statement "result/=y". Notice that this statement includes the compound division operator "/=", thus this statement may be implemented by the compound division operation (see above with reference to FIG. 14).

Fourth, the temporary result is assigned to z. This step is accomplished by the assignment operator ("="). When the result is assigned to z, the format conversion is implicit.

Conversion Operation

FIG. 16 is a listing showing a code portion 1600 of an example implementation of the conversion operation written in C++. The code portion 1600 may be part of the header program "fixed.h". In general, the code portion 1600 operates to convert the variable x from format (a1,b1) to format (a2, b2).

Unary Subtraction Operation

FIG. 17 is a listing showing a code portion 1700 of an example implementation of the unary subtraction operation written in C++. The code portion 1700 may be part of the header program "fixed.cpp". In general, the code portion 1700 operates to perform a sign inversion on the FIXED object "result". The format is maintained the same, but the value is set to the negative of the input FIXED object value.

Equality Test Operation

FIG. 18 is a listing showing a code portion 1900 of an example implementation of the equality test operation written in C++. The code portion 1900 may be part of the header program "fixed.cpp".

In general, the code portion 1900 operates as follows. Consider the comparison "x==y", where x has the format (a1,b1) and y has the format (a2,b2). First, y is aligned to the format of x, using the "aligned_val( )" function. Second, the newly-aligned y is compared to x, and the result of the comparison (e.g., true or false, 1 or 0, etc.) is returned.

Inequality Test Operation

FIG. 19 is a listing showing a code portion 2000 of an example implementation of the inequality test operation written in C++. The code portion 2000 may be part of the header program "fixed.cpp".

In general, the code portion 2000 operates as follows. Consider the comparison "x!=y", where x has the format (a1,b1) and y has the format (a2,b2). First, x is compared to y using the equality test operation "==", as described above with reference to FIG. 18. Second, the converse of the result of the equality comparison is returned.

Implementation Details

An embodiment of the invention may be implemented in hardware, executable modules stored on a computer readable medium, or a combination of both (e.g., programmable logic arrays). Unless otherwise specified, the steps included as part of the invention need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible signals are excluded to the extent that they are unpatentable subject matter.)

Figure 20:
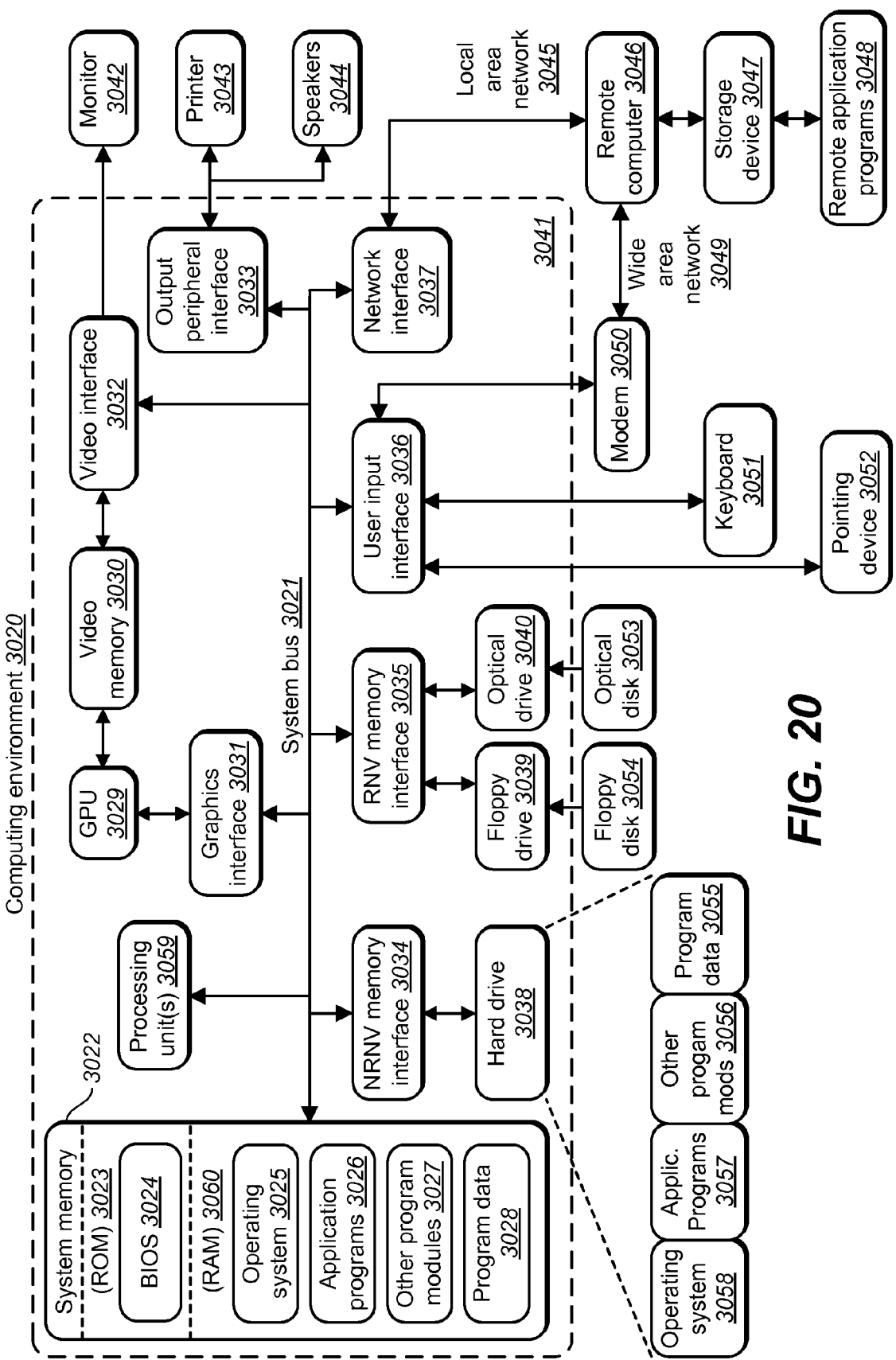
FIG. 20 is a block diagram representing an exemplary computing device suitable for use in conjunction with implementing one or more of the processes or devices described above.

FIG. 20 is a block diagram representing an exemplary computing device 3020 suitable for use in conjunction with implementing one or more of the processes or devices described above. For example, the computer executable instructions that carry out the processes and methods to implement and operate the FIXED class may reside and/or be executed in such a computing environment as shown in FIG. 20. As another example, a computer system for editing or storing the source code 102 (see FIG. 1), or for compiling the source code 102 into the object code 110, may include one or more components of the computing environment as shown in FIG. 20.

The computing system environment 3020 is only one example of a suitable computing environment and is not intended to suggest any limitation as to the scope of use or functionality of the invention. Neither should the computing environment 3020 be interpreted as having any dependency or requirement relating to any one or combination of components illustrated in the exemplary operating environment 3020.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 3041. Components of computer 3041 may include, but are not limited to, a processing unit 3059, a system memory 3022, and a system bus 3021 that couples various system components including the system memory to the processing unit 3059. The system bus 3021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 3041 typically includes a variety of computer readable media. Computer readable media can be any available media that can be accessed by computer 3041 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 3041. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media (but not necessarily computer readable storage media; for example, a data signal that is not stored).

The system memory 3022 includes computer storage media in the form of volatile and/or nonvolatile memory such as read only memory (ROM) 3023 and random access memory (RAM) 3060. A basic input/output system 3024 (BIOS), containing the basic routines that help to transfer information between elements within computer 3041, such as during start-up, is typically stored in ROM 3023. RAM 3060 typically contains data and/or program modules that are immediately accessible to and/or presently being operated on by processing unit 3059. By way of example, and not limitation, FIG. 20 illustrates operating system 3025, application programs 3026, other program modules 3027, and program data 3028.

The computer 3041 may also include other removable/non-removable, volatile/nonvolatile computer storage media. By way of example only, FIG. 20 illustrates a hard disk drive 3038 that reads from or writes to non-removable, nonvolatile magnetic media, a magnetic disk drive 3039 that reads from or writes to a removable, nonvolatile magnetic disk 3054, and an optical disk drive 3040 that reads from or writes to a removable, nonvolatile optical disk 3053 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 3038 is typically connected to the system bus 3021 through an non-removable memory interface such as interface 3034, and magnetic disk drive 3039 and optical disk drive 3040 are typically connected to the system bus 3021 by a removable memory interface, such as interface 3035.

The drives and their associated computer storage media discussed above and illustrated in FIG. 20, provide storage of computer readable instructions, data structures, program modules and other data for the computer 3041. In FIG. 20, for example, hard disk drive 3038 is illustrated as storing operating system 3058, application programs 3057, other program modules 3056, and program data 3055. Note that these components can either be the same as or different from operating system 3025, application programs 3026, other program modules 3027, and program data 3028. Operating system 3058, application programs 3057, other program modules 3056, and program data 3055 are given different numbers here to illustrate that, at a minimum, they are different copies. A user may enter commands and information into the computer 3041 through input devices such as a keyboard 3051 and pointing device 3052, commonly referred to as a mouse, trackball or touch pad. Other input devices (not shown) may include a microphone, joystick, game pad, satellite dish, scanner, or the like. These and other input devices are often connected to the processing unit 3059 through a user input interface 3036 that is coupled to the system bus, but may be connected by other interface and bus structures, such as a parallel port, game port or a universal serial bus (USB). A monitor 3042 or other type of display device is also connected to the system bus 3021 via an interface, such as a video interface 3032. For complex graphics, the computer 3041 may offload graphics processing through the graphics interface 3031 for processing by the graphics processing unit 3029. The graphics rendered by the graphics processing unit 3029 may be stored in the video memory 3030 and provided to the video interface 3032. In addition to the monitor, computers may also include other peripheral output devices such as speakers 3044 and printer 3043, which may be connected through a output peripheral interface 3033.

The computer 3041 may operate in a networked environment using logical connections to one or more remote computers, such as a remote computer 3046. The remote computer 3046 may be a personal computer, a server, a router, a network PC, a peer device or other common network node, and typically includes many or all of the elements described above relative to the computer 3041, although only a memory storage device 3047 has been illustrated in FIG. 20. The logical connections depicted in FIG. 20 include a local area network (LAN) 3045 and a wide area network (WAN) 3049, but may also include other networks. Such networking environments are commonplace in offices, enterprise-wide computer networks, intranets and the Internet.

When used in a LAN networking environment, the computer 3041 is connected to the LAN 3045 through a network interface or adapter 3037. When used in a WAN networking environment, the computer 3041 typically includes a modem 3050 or other means for establishing communications over the WAN 3049, such as the Internet. The modem 3050, which may be internal or external, may be connected to the system bus 3021 via the user input interface 3036, or other appropriate mechanism. In a networked environment, program modules depicted relative to the computer 3041, or portions thereof, may be stored in the remote memory storage device.

By way of example, and not limitation, FIG. 20 illustrates remote application programs 3048 as residing on memory device 3047. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and nonvolatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more standalone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Differences from Other Existing Solutions

An embodiment may have one or more differences as compared to other existing solutions. One difference is the ability to use differently-formatted variables (with regard to fractional bit precision) within a single operation, and to convert a variable between different fractional bit precisions. Another difference, as compared to the '177 patent, is that a statistical analysis need not be performed, but instead the target precision may be selected at compilation for a particular target architecture. Another difference, as compared to the '177 patent, is that a programmer may mix operations that have different fractional precisions; this allows the programmer to write the program to account for the precision requirements for the particular process and the target architecture. Another difference, as compared to the '177 patent, is that the programmer can write code that specifically targets the precision capabilities of specific FPGAs or DSPs (or the components therein).

Another difference, as compared to IBM's DFP document, is that the operations are natively performed in base-2 on fixed point values stored in a 64 bit word. The binary point may be adjusted using commands to change the precision, e.g. from (a1,b1) to (a2,b2). Since these are natively integer operations, the integer ALUs may perform these computations, without the need for additional hardware. However, when additional hardware units (e.g., power, square root, logarithm) are present, they may be used in order to enhance performance of the program. In addition, the FIXED class adds different rounding modes to match the order of operations with the RTL/hardware units during the verification process.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

LIST OF REFERENCES

1. U.S. Pat. No. 6,460,177
2. IBM Corporation, Decimal Floating Point (DFP) Functionality: Technical Preview (2007)
3. U.S. Pat. No. 6,256,776
4. U.S. Pat. No. 6,941,329
5. U.S. Pat. No. 7,389,499
6. U.S. Application Pub. No. 2007/0276647
7. U.S. Application Pub. No. 2009/0077353
8. European Patent Office Pub. No. EP 0 378 830 B1
9. PCT Pub. No. WO 2009/017849 A1

What is claimed is:

1. A computer implemented method of performing computer operations using a first fractional precision and a second fractional precision, comprising:
    accessing with the computer a source variable, a destination variable, and an operation, wherein the source variable has a first dynamic fractional precision, wherein the destination variable has a second dynamic fractional precision that differs from the first dynamic fractional precision, and wherein the operation is related to the source variable and the destination variable;
    determining a difference between the first dynamic fractional precision and the second dynamic fractional precision;
    converting the source variable to be of the second dynamic fractional precision of the destination variable, according to the difference between the first dynamic fractional precision and the second dynamic fractional precision;
    performing the operation using the destination variable and the source variable; and
    assigning a value to the destination variable according to the operation.

2. The method of claim 1, wherein the source variable has a dynamic precision that includes an integer part and a fractional part, wherein the fractional part corresponds to the first dynamic fractional precision.

3. The method of claim 1, wherein the destination variable has a dynamic precision that includes an integer part and a fractional part, wherein the fractional part corresponds to the second dynamic fractional precision.

4. The method of claim 1, wherein the source variable has a maximum number of bits, a dynamic integer part and a dynamic fractional part, and wherein the dynamic integer part and the dynamic fractional part are within the maximum number of bits.

5. The method of claim 1, wherein the destination variable has a maximum number of bits, a dynamic integer part and a dynamic fractional part, and wherein the dynamic integer part and the dynamic fractional part are within the maximum number of bits.

6. The method of claim 1, wherein the operation comprises an assignment operation, wherein the source variable has a source value and a first dynamic integer precision, wherein the destination variable has a second dynamic integer precision, wherein performing the operation comprises adjusting the source value according to the first dynamic integer precision and the second dynamic integer precision, and wherein assigning the value comprises assigning the source value having been adjusted to the destination variable.

7. The method of claim 1, wherein the operation comprises a compound addition operation, wherein the source variable has a source value, wherein the destination variable has a dynamic integer precision, wherein performing the operation comprises:
    adding an initial value and the source value to result in a destination value; and
    adjusting the destination value according to the dynamic integer precision,
    wherein assigning the value comprises assigning the destination value having been adjusted to the destination variable.

8. The method of claim 1, wherein the operation comprises an addition operation, wherein the source variable comprises a first source variable having a first source value, wherein a second source variable has a second source value and a third dynamic fractional precision, wherein the destination variable has a dynamic integer precision, wherein converting comprises:
    formatting a temporary variable according to the first dynamic fractional precision and the third dynamic fractional precision;
    assigning the second source value to the temporary variable as a temporary value; and
    aligning the first source variable to the format of the temporary variable,
    wherein performing the operation comprises:
        adding the temporary value and the first source value to result in a destination value; and
        adjusting the destination value according to the dynamic integer precision, and
    wherein assigning the value comprises assigning the destination value having been adjusted to the destination variable.

9. The method of claim 1, wherein the operation comprises a compound multiplication operation, wherein the source variable has a source value, wherein the destination variable has a destination value, wherein performing the operation comprises:
    multiplying the destination value and the source value to result in a temporary value;
    right-shifting the temporary value according to the first dynamic fractional precision; and
    rounding the temporary value according to a value shifted out according to the temporary value having been right-shifted,
    wherein assigning the value comprises assigning the temporary value having been rounded to the destination variable.

10. The method of claim 1, wherein the operation comprises a multiplication operation, wherein the source variable comprises a first source variable having a first source value and a first dynamic integer precision, wherein a second source variable has a second source value, a third dynamic fractional precision, and a second dynamic integer precision, and wherein converting comprises:

formatting a temporary variable according to the first dynamic fractional precision, the third dynamic fractional precision, the first dynamic integer precision, the second dynamic integer precision, and a maximum number of bits;

wherein performing the operation comprises multiplying the first source value and the second source value to result in a temporary value, and wherein assigning the value comprises assigning the temporary value to the destination variable.

11. The method of claim 1, wherein the converting comprises:

adjusting the source variable according to the difference between the first dynamic fractional precision and the second dynamic fractional precision.

12. The method of claim 1, wherein, when the first dynamic fractional precision is less than the second dynamic fractional precision, the converting comprises:

increasing a value of the source variable.

13. The method of claim 1, wherein, when the second dynamic fractional precision is less than the first dynamic fractional precision, the converting comprises:

decreasing a value of the of the source variable; and reducing the first dynamic fractional precision to match the second dynamic fractional precision.

14. The method of claim 1, wherein, when the second dynamic fractional precision is less than the first dynamic fractional precision, the converting comprises:

decreasing a value of the of the source variable;

reducing the first dynamic fractional precision to match the second dynamic fractional precision; and adjusting the value of the source variable according to a specified rounding mode.

15. The method of claim 1, further comprising:

receiving information indicating a target architecture; and compiling the computer program according to the information indicating the target architecture.

16. The method of claim 1, wherein converting the source variable is implemented according to a class definition written in an object-oriented programming language.

17. The method of claim 1, wherein performing the operation is implemented according to a class definition written in an object-oriented programming language.

18. The method of claim 1, wherein converting the source variable and performing the operation are implemented according to a class definition in an object-oriented programming language.

19. An apparatus for performing computer operations using a first fractional precision and a second fractional precision, comprising:

a memory device that is configured to store a computer program having a source variable, a destination variable, and an operation, wherein the source variable has a first dynamic fractional precision, wherein the destination variable has a second dynamic fractional precision that differs from the first dynamic fractional precision, and wherein the operation is related to the source variable and the destination variable; and a processor that is configured to determine a difference between the first dynamic fractional precision and the second dynamic fractional precision, convert the source variable to be of the second dynamic fractional precision of the destination variable, according to the difference between the first dynamic fractional precision and the second dynamic fractional precision, that is configured to perform the operation using the destination variable and the source variable, and that is configured to assign a value to the destination variable according to the operation.

20. A non-transitory computer readable medium, comprising software instructions that when executed by one or more processors cause the one or more processors to:

read a source variable, a destination variable, and an operation, wherein the source variable has a first dynamic fractional precision, wherein the destination variable has a second dynamic fractional precision that differs from the first dynamic fractional precision, and wherein the operation is related to the source variable and the destination variable;

determine a difference between the first dynamic fractional precision and the second dynamic fractional precision;

convert the source variable to be of the second dynamic fractional precision of the destination variable, according to the difference between the first dynamic fractional precision and the second dynamic fractional precision;

perform the operation using the destination variable and the source variable; and assign a value to the destination variable according to the operation.

* * * * *